US011997530B2

(12) United States Patent
Ali et al.

(10) Patent No.: US 11,997,530 B2
(45) Date of Patent: May 28, 2024

(54) QoS MANAGEMENT ASPECTS FOR NR SIDELINK TO SUPPORT ADVANCED V2X USE CASES

(71) Applicant: Apple Inc., Cupertino, CA (US)

(72) Inventors: Ansab Ali, Hillsboro, OR (US); Kyeongin Jeong, Portland, OR (US); Sangeetha L. Bangolae, Houston, TX (US); Youn Hyoung Heo, Seoul (KR)

(73) Assignee: Apple Inc., Cupertino, CA (US)

(*) Notice: Subject to any disclaimer, the term of this patent is extended or adjusted under 35 U.S.C. 154(b) by 546 days.

(21) Appl. No.: 17/250,920

(22) PCT Filed: Sep. 27, 2019

(86) PCT No.: PCT/US2019/053417
§ 371 (c)(1),
(2) Date: Mar. 26, 2021

(87) PCT Pub. No.: WO2020/069291
PCT Pub. Date: Apr. 2, 2020

(65) Prior Publication Data
US 2021/0337423 A1 Oct. 28, 2021

Related U.S. Application Data

(60) Provisional application No. 62/737,488, filed on Sep. 27, 2018.

(51) Int. Cl.
H04W 28/02 (2009.01)
H04W 4/40 (2018.01)
H04W 28/24 (2009.01)

(52) U.S. Cl.
CPC ......... H04W 28/0268 (2013.01); H04W 4/40 (2018.02); H04W 28/0263 (2013.01); H04W 28/24 (2013.01)

(58) Field of Classification Search
CPC ... H04W 28/04; H04W 72/04; H04W 72/042; H04W 88/08; H04W 28/0268;
(Continued)

(56) References Cited

U.S. PATENT DOCUMENTS

2017/0201461 A1 7/2017 Cheng et al.
2019/0230572 A1* 7/2019 Cheng ..................... H04L 47/24
2019/0230645 A1* 7/2019 Cheng ..................... H04W 4/70

FOREIGN PATENT DOCUMENTS

WO 2017-003230 1/2017
WO WO 2017/003230 A1 * 1/2017 ............ H04W 76/20
(Continued)

OTHER PUBLICATIONS

3GPP TSG RAN WG1 Meeting #94, Gothenburg, Sweden, Aug. 20-24, 2018, R1-1808540, Agenda item: 7.2.4.4, Source: Fraunhofer IIS, Fraunhofer HHI, Title: QoS Management for NR V2X. (Year: 2018).*
(Continued)

Primary Examiner — Peter G Solinsky
Assistant Examiner — Sanjay K Dewan
(74) Attorney, Agent, or Firm — Fay Kaplun & Marcin, LLP

(57) ABSTRACT

An apparatus of a first user equipment (UE) comprises one or more baseband processors to generate a message for a second UE to configure a New Radio (NR) vehicle-to-everything (V2X) link between the first UE and the second UE, wherein the message includes a Quality of Service (QoS) metric to encode a plurality of QoS parameters for the NR V2X link, and to encode a packet for the second UE according to the QoS parameter. The apparatus can include a memory to store the message.

20 Claims, 4 Drawing Sheets

(58) Field of Classification Search
CPC ... H04W 4/40; H04W 28/0263; H04W 28/24; H04L 5/0007
USPC .......................................................... 370/329
See application file for complete search history.

(56) References Cited

FOREIGN PATENT DOCUMENTS

| WO | 2017-173579 | 10/2017 | | |
| WO | WO 2017173579 A1 * | 10/2017 | ............ | H04W 28/02 |
| WO | WO 2020/033628 A1 * | 2/2020 | ............ | H04W 76/14 |
| WO | WO 2020/064325 A1 * | 4/2020 | ............ | H04W 72/12 |
| WO | WO 2020/069291 A1 * | 4/2020 | ............ | H04W 28/02 |

OTHER PUBLICATIONS

3GPP TR 23.786 v0.8.0 (2018-08), Technical Report, 3rd Generation Partnership Project; Technical Specification Group Services and System Aspects; Study on architecture enhancements for EPS and 5G System to support advanced V2X services (Release 16). (Year: 2018).*

3GPP TR 23/786V0.8.0, "3GPP TSGSSA; Study on architecture enhancements for EPS and 5G System to support advanced V2X services", Aug. 2018.

Fraunhofer IIS et al., "QoS Management for NR V2X", R1-1808540, 3GPP TSG RAN WG1, Aug. 2018.

* cited by examiner

| QoS METRIC = 1 | QoS METRIC = 2 |
| PPPP = (1-4)<br>PPPR = (1-4)<br>LATENCY REQUIREMENT = (3-10) | PPPP = (5-8)<br>PPPR = (5-8)<br>LATENCY REQUIREMENT = (3-30) |

| QoS METRIC = 3 | QoS METRIC = 4 |
| PPPP = (9-12)<br>PPPR = (9-12)<br>LATENCY REQUIREMENT = (30-50) | PPPP = (13-16)<br>PPPR = (13-16)<br>LATENCY REQUIREMENT = (30-100) |

QoS MANAGEMENT ASPECTS FOR NR SIDELINK TO SUPPORT ADVANCED V2X USE CASES

CROSS-REFERENCE TO RELATED APPLICATIONS

The present application claims the benefit of U.S. Provisional Application No. 62/737,488 (AB5639-Z) filed Sep. 27, 2018. Said Application No. 62/737,488 is hereby incorporated herein by reference in its entirety.

BACKGROUND

As the use of New Radio (NR) becomes prevalent and widespread and new use cases of advanced vehicle-to-vehicle communication are identified, mechanisms for NR based systems should be supported to meet the associated requirements for these use cases. As the Third Generation Partnership Project (3GPP) vehicle-to-everything (V2X) standards evolve to incorporate advanced V2X use cases that go beyond road safety applications, NR based V2X should adapt to be able to meet the diverse set of requirements set by these use cases. These include aspects such as latency, from three milliseconds (ms) in case of emergency trajectory change to 100 ms, end-to-end reliability, from 90% to 99.999%, data rate, up to 1000 megabits per second (Mbps) for extended sensor use case, and so on. These are much more stringent as well as varied compared to basic V2X use cases addressed in Long Term Evolution (LTE) V2X. The following parameters seek to represent these service requirements for NR V2X.
Payload (Bytes)
Transmission rate (Messages/Sec)
Maximum end-to-end latency (ms)
Reliability (%)
Data rate (Mbps)
Minimum required communication range (meters)
In order to meet such requirements, the Quality of Service (QoS) framework for NR V2X should be enhanced compared to LTE.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
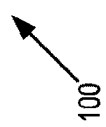
FIG. 1 is a diagram of mapping various Quality of Service (QoS) related parameters to a unique identifier in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of mapping various Quality of Service (QoS) related parameters to a unique identifier in accordance with one or more embodiments will be discussed. The overall Long Term Evolution (LTE) based vehicle-to-everything (V2X) design over sidelink inherently is based on broadcast wherein all packets sent by vehicular user equipment (V-UE) devices over sidelink are sent blindly and optionally with a fixed number of retransmissions. As a result, the Quality of Service (QoS) offered by this broadcast mechanism is based on indicating a single priority value, Proximity Services (ProSe) per-packet priority (PPPP) associated to each V2X packet. This serves as the main QoS metric for any access stratum (AS) layer procedures, for example media access control (MAC) scheduling and/or multiplexing and resource selection and/or reservation procedure for transmission. This is in contrast to operation over Uu, where the QoS management is based on radio resource control (RRC) configuration of appropriate MAC layer parameters related to specific logical channels. In Release 15 of the Third Generation Partnership Project (3GPP) standard, the concept of duplicated transmissions on multiple carriers at the Packet Data Convergence Protocol (PDCP) layer was added to enhance reliability and an additional QoS metric for indicating reliability requirement for each packet for ProSe per-packet reliability (PPPR). There is no concept, however, of feedback due to the inherent broadcast nature of V2X transmissions. This has a consequence that the QoS for LTE V2X is packet driven wherein each packet has some QoS parameter or parameters associated with it and the radio layers seek to meet the associated QoS requirements on a per-packet basis.

For New Radio (NR), one concept is establishment of one-to-one or one-to-many connections over sidelink which allow for unicast or groupcast V2X communication. This implies that the UEs shall set up a connection and exchange necessary information and related rules to agree upon a common means of communication. One of these rules is the expected QoS to be afforded by such a link. This also raises a fundamental question as to whether the QoS framework for such unicast and/or groupcast links should directly follow the per-packet QoS methodology in LTE. Regardless of whether the application and/or upper layers differentiate between radio access technologies (RATs) and interface when considering the QoS requirement, the question is whether the QoS framework for NR fundamentally can be based on LTE in its design philosophy. In this regard, this question can be addressed by considering the extension of per-packet QoS as in LTE to NR sidelink as well as defining a unified QoS metric to simplify lower layer operations.

An additional aspect to consider is that NR resource allocation for sidelink transmission is expected to follow the LTE mechanism wherein two distinct modes: the network scheduled transmissions where the evolved NodeB (eNB) schedules specific resources and the autonomous resources reservation and/or reselection mode where the UE selects resources based on sensing. For the latter case, since it is inherently based on the notion of collision detection and avoidance on a broadcast channel, QoS requirements may or may not be strictly guaranteed unless non-contention resources are allocated for this purpose.

As discussed above for the case of LTE, each packet generated by the application layer is assigned a PC5 QoS identifier or parameter based on some mapping by the V2X function. The packet is then passed to the AS layer along with this QoS parameter. The same principle can simply be extended to at least NR V2X broadcast transmission over sidelink. The exact parameter or parameters to be indicated can be different and can evolve compared to LTE to meet the NR V2X use case requirement as discussed below. Considering the set of parameters outlined above, each parameter is shown individually below in terms of their impact on the AS layer procedures for QoS.

TABLE 1

QoS Parameters and associated impact on the AS layer

| QoS Parameter | Expected range | Impact foreseen on AS layer |
|---|---|---|
| Payload (Bytes) | 50-6500 | Does not need to be explicitly indicated, as long as segmentation can be handled by RLC |
| Transmission rate (Message/Sec) | 2-50 | |
| Maximum end-to-end latency (ms) | 3 to 100 | Needs to be indicated and explicitly addressed |
| Reliability (%) | 90-99.999 | Needs to be indicated and explicitly addressed |
| Data rate (Mbps) | 0.25-1000 | At least for the case of NW scheduled mode, gNB can handle by appropriate configuration of resources based on BSR reporting etc. |
| Minimum required communication range (meters) | 50-1000 | Can be handled by choice of appropriate RAT at the upper layers. Can be indicated to L1 if considered beneficial |

In LTE, the packet delay budget (PDB) associated with each packet was derived from the priority metric PPPP, so from the AS layer point of view, they can be considered equivalent. Alternatively, both latency and priority can be separately indicated if it is envisioned that priority is a standalone metric. For example, this can be useful for L1 resource pre-emption for critical V2X services. Considering operation in network controlled mode, assuming that at least the latency and/or priority and reliability requirement need to be considered for QoS, the MAC layer routines can follow similar behavior as in LTE.

Buffer Status Reporting (BSR) reporting based on priority, latency and reliability Logical Channel ID (LCID) mapping and multiplexing of protocol; data units (PDUs) based on priority and latency and subsequent indication to the lower layer.

For autonomous resource selection mode, additionally the following can be the same as with LTE.

The mapping of LCIDs to priority, latency and reliability can be specified or configured, or left to the UE implementation as in LTE, depending on whether there is a need for stricter NW control on such mapping at the UE for sidelink.

Scheduling across different/multiple carriers based on data rate requirement and/or reliability Usage of a QoS metric for resource pool reservation in addition to zone configuration Physical layer related procedures such as resource reservation/selection will also need to be considered in MAC. It is expected that physical layer procedures for autonomous case will be enhanced compared to LTE to handle issues such as congestion and extensive resource usage by high priority transmissions which can otherwise result in resource starvation for other UEs.

Regarding the abundance of possible values that should be addressed, at least the parameters to handle priority and reliability requirement can be defined with additional granularity. As a comparison for LTE, eight unique values were defined for PPPP and PPPR to represent the priority and reliability respectively. For NR, given the wider range of requirements, up to 16 values can be considered for both parameters.

In addition, the unification of the QoS parameters at the AS layer to a single, comprehensive metric can be considered based on some configured or preconfigured mapping to simplify lower layer operations. For instance, an overall QoS priority metric which represents set of specific priority, delay, and reliability values can be considered. The granularity of such mapping can be configurable to cater to a wide variety of scenarios. The upper layer can either perform this mapping and simply indicate the relevant value for this new QoS metric to the AS layer or this mapping can be configured at the AS layer and can be used to map each incoming packet to the relevant value, as shown in FIG. 1. For the mapping 100 of FIG. 1, it is assumed that PPPP and PPPR span a set of values from 1 to 16. Additionally, it should be noted that the latency requirement or an equivalent metric can be mapped in an overlapped fashion. In general, such mapping can be highly flexible if required to cater to different coverage and deployment scenarios if needed, or the mapping can be hardcoded in the specification for ease of implementation.

One big advantage to reusing the per-packet QoS methodology from LTE is compatibility with legacy architectures. For instance, a NR V2X UE should be able to support legacy V2X services and be able to interact with legacy V2X UEs. This means that any new QoS mechanism should be flexible enough to handle the legacy QoS based on PPPP. Reusing the same methodology of per packet QoS can allow this case to be handled easily, even with differing granularity, for example by configuring a mapping between the new unified QoS parameter and legacy PPPP values. Another advantage is flexible QoS handling for V2X packets with differing characteristics generated by the same application. It is possible that a given V2X service generates packets with different QoS requirements and using the per-packet based methodology allows for the AS layer to handle these in a simple and efficient fashion.

In addition, based on whether unicast communication is supported for NR sidelink for V2X, the question is whether the per-packet QoS is sufficient or whether there is a need for further enhancements. Assuming that this involves the set-up of a secure Layer 2 link between two UEs over sidelink, two different options can be considered.

In a first option, once the unicast link is established, the upper layer can still follow the same behavior as in broadcast wherein each packet has an associated set of QoS parameters, or the unified QoS metric. The MAC layer procedures can simply follow the same rules as broadcast for proper processing of this packet.

In a second option, based on some pre-negotiation between the two UEs to agree on specific QoS characteristics associated with this link, a mapping between the unique link ID, which can be for example based on unique source and destination identifier tuple, and the V2X service is created. Subsequently, only the corresponding link ID alongside each packet is indicated, and a new sublayer can be provided that is responsible for maintaining this mapping and informing the AS layer of the set of QoS parameters, or the combined QoS metric, required for this link. The main advantage of this is enhanced efficiency and reduced signaling in case the QoS characteristics for all packets destined for this link do not vary, which may not always be true. For instance, in case of advanced driving, a unicast link otherwise established for high data rate but low reliability. For example, video sharing would not have suitable QoS support for emergency collision avoidance and emergency trajectory alignment. In this case, the UE may have to rely on broadcast mechanism or some other option to send this critical packet anyway.

Figure 2:
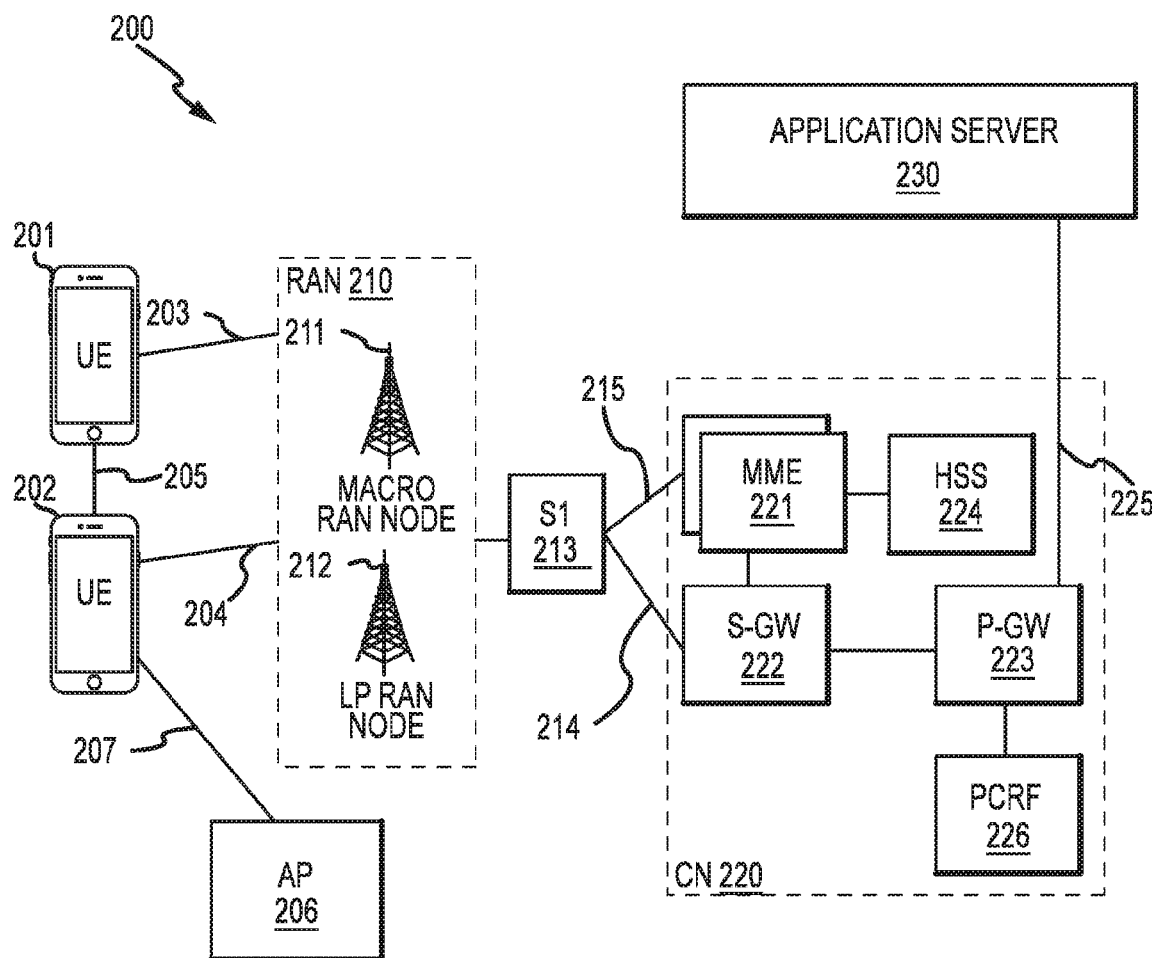
FIG. 2 illustrates an architecture of a system of a network in accordance with some embodiments.

FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210—the RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSCCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
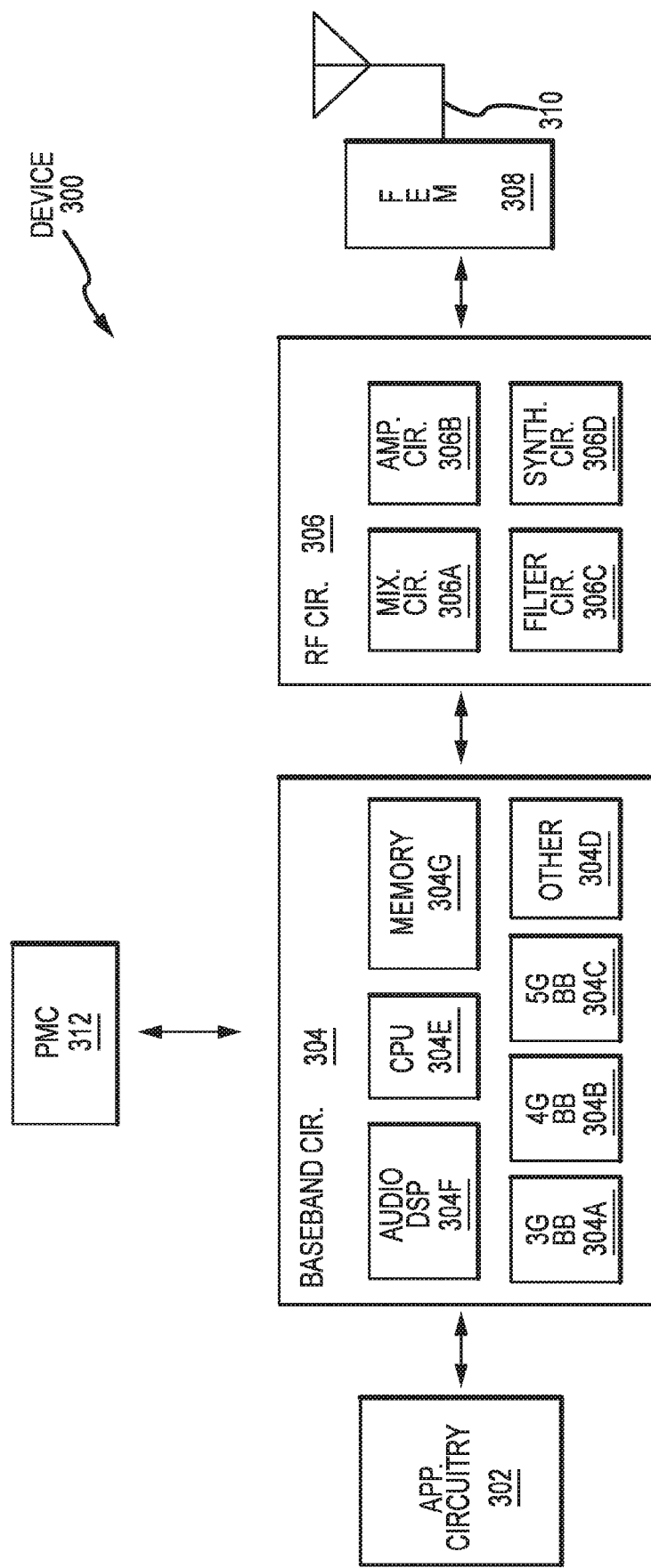
FIG. 3 illustrates example components of a device in accordance with some embodiments.

FIG. 3 illustrates example components of a device 300 in accordance with some embodiments. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or a RAN node. In some embodiments, the device 300 may include less elements (e.g., a RAN node may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), preceding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU IRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect. In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage-controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
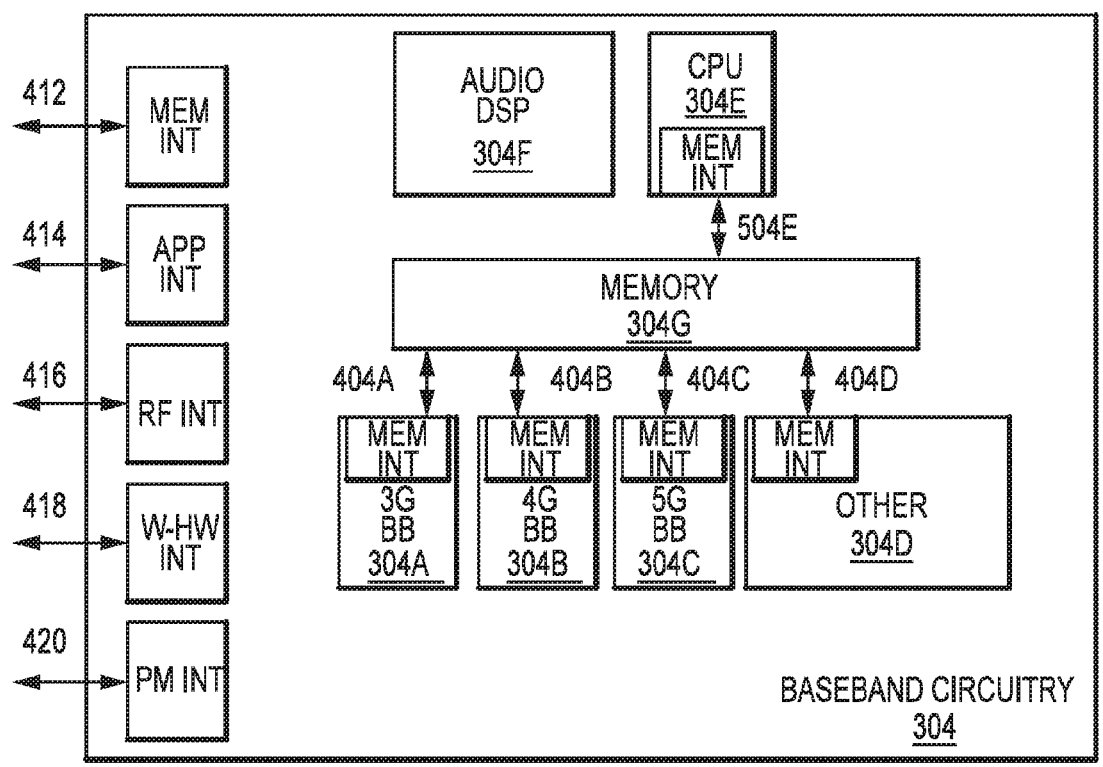
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312.

The following are example implementations of the subject matter described herein. In example one, an apparatus of a first user equipment (UE) comprises one or more baseband processors to generate a message for a second UE to configure a New Radio (NR) vehicle-to-everything (V2X) link between the first UE and the second UE, wherein the message includes a Quality of Service (QoS) metric to encode a plurality of QoS parameters for the NR V2X link, and to encode a packet for the second UE according to the QoS parameter, and a memory to store the message. In example two, the QoS metric includes a Proximity Services (ProSe) per-packet priority (PPPP) parameter having a value from one to 16. In example three, the QoS metric includes a Proximity Services (ProSe) per-packet reliability (PPPP) parameter having a value from one to 16. In example four, the QoS metric includes latency requirement parameter. In example five, the QoS parameters are selected based on an intended use for the NR V2X link. In example six, the message is to be broadcast to a plurality of UE and the QoS metric is selected based on an operational mode for the NR V2X sidelink. In example seven, the QoS parameter includes a subset of available QoS parameters for the NR V2X link. In example eight, the message is to be broadcast using a same QoS metric as a unicast link between the first UE and the second UE. In example nine, the first UE and the second UE are to exchange QoS parameters to be used over the NR V2X link. In example ten, the QoS parameters are mapped to a unique source identifier (ID) and a unique destination ID for the NR V2X link.

In example eleven, one or more machine-readable media have instructions thereon that, when executed by an apparatus of a first user equipment (UE), result in generating a message for a second UE to configure a New Radio (NR) vehicle-to-everything (V2X) link between the first UE and the second UE, wherein the message includes a Quality of Service (QoS) metric to encode a plurality of QoS parameters for the NR V2X link, and encoding a packet for the second UE according to the QoS parameter. In example twelve, the QoS metric includes a Proximity Services (ProSe) per-packet priority (PPPP) parameter having a value from one to 16. In example thirteen, the QoS metric includes a Proximity Services (ProSe) per-packet reliability (PPPP) parameter having a value from one to 16. In example fourteen, the QoS metric includes latency requirement parameter. In example fifteen, the QoS parameters are selected based on an intended use for the NR V2X link. In example sixteen, the message is to be broadcast to a plurality of UE and the QoS metric is selected based on an operational mode for the NR V2X sidelink. In example seventeen, the QoS parameter includes a subset of available QoS parameters for the NR V2X link. In example eighteen, the message is to be broadcast using a same QoS metric as a unicast link between the first UE and the second UE. In example nineteen, the first UE and the second UE are to exchange QoS parameters to be used over the NR V2X link. In example twenty, the QoS parameters are mapped to a unique source identifier (ID) and a unique destination ID for the NR V2X link.

Although the claimed subject matter has been described with a certain degree of particularity, it should be recognized that elements thereof may be altered by persons skilled in the art without departing from the spirit and/or scope of claimed subject matter. It is believed that the subject matter pertaining to QoS management aspects for nr sidelink to support advanced V2X use cases and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a first user equipment (UE), comprising:

radio frequency circuitry configured to communicate with a second UE; and one or more baseband processors to generate a message for the second UE to configure a New Radio (NR) vehicle-to-everything (V2X) link between the first UE and the second UE, wherein the message includes a Quality of Service (QoS) metric that represents a set of QoS parameters comprising at least a priority parameter value, a delay parameter value and a reliability parameter value for the NR V2X link, and to encode a packet for the second UE according to the QoS parameter.

2. The apparatus of claim 1, wherein the QoS metric includes a Proximity Services (ProSe) per-packet priority (PPPP) parameter having a value from one to 16.

3. The apparatus of claim 1, wherein the QoS metric includes a Proximity Services (ProSe) per-packet reliability (PPPR) parameter having a value from one to 16.

4. The apparatus of claim 1, wherein the QoS metric includes latency requirement parameter.

5. The apparatus of claim 1, wherein the QoS parameters are selected based on an intended use for the NR V2X link.

6. The apparatus of claim 1, wherein the message is to be broadcast to a plurality of UE and the QoS metric is selected based on an operational mode for the NR V2X sidelink.

7. The apparatus of claim 6, wherein the message is to be broadcast using a same QoS metric as a unicast link between the first UE and the second UE.

8. The apparatus of claim 1, wherein the QoS parameter includes a subset of available QoS parameters for the NR V2X link.

9. The apparatus of claim 1, wherein the first UE and the second UE are to exchange QoS parameters to be used over the NR V2X link.

10. The apparatus of claim 9, wherein the QoS parameters are mapped to a unique source identifier (ID) and a unique destination ID for the NR V2X link.

11. Non-transitory machine-readable media having instructions thereon that, when executed by an apparatus of a first user equipment (UE), result in:

generating a message for a second UE to configure a New Radio (NR) vehicle-to-everything (V2X) link between the first UE and the second UE, wherein the message includes a Quality of Service (QoS) metric that represents a set of QoS parameters comprising at least a priority parameter value, a delay parameter value and a reliability parameter value for the NR V2X link; and encoding a packet for the second UE according to the QoS parameter.

12. The non-transitory machine-readable media of claim 11, wherein the QoS metric includes a Proximity Services (ProSe) per-packet priority (PPPP) parameter having a value from one to 16.

13. The non-transitory machine-readable media of claim 11, wherein the QoS metric includes a Proximity Services (ProSe) per-packet reliability (PPPR) parameter having a value from one to 16.

14. The non-transitory machine-readable media of claim 11, wherein the QoS metric includes latency requirement parameter.

15. The non-transitory machine-readable media of claim 11, wherein the QoS parameters are selected based on an intended use for the NR V2X link.

16. The non-transitory machine-readable media of claim 11, wherein the message is to be broadcast to a plurality of UE and the QoS metric is selected based on an operational mode for the NR V2X sidelink.

17. The non-transitory machine-readable media of claim 16, wherein the message is to be broadcast using a same QoS metric as a unicast link between the first UE and the second UE.

18. The non-transitory machine-readable media of claim 11, wherein the QoS parameter includes a subset of available QoS parameters for the NR V2X link.

19. The non-transitory machine-readable media of claim 11, wherein the first UE and the second UE are to exchange QoS parameters to be used over the NR V2X link.

20. The non-transitory machine-readable media of claim 19, wherein the QoS parameter are mapped to a unique source identifier (ID) and a unique destination ID for the NR V2X.

\* \* \* \* \*